M. B. WALKER AND G. A. MARTIN.
GARAGE SHOP MOTOR CRANKING MACHINE.
APPLICATION FILED MAR. 16, 1920.

1,366,614.

Patented Jan. 25, 1921.
2 SHEETS—SHEET 1.

WITNESSES

INVENTOR
M. B. Walker & G. A. Martin
BY
ATTORNEYS

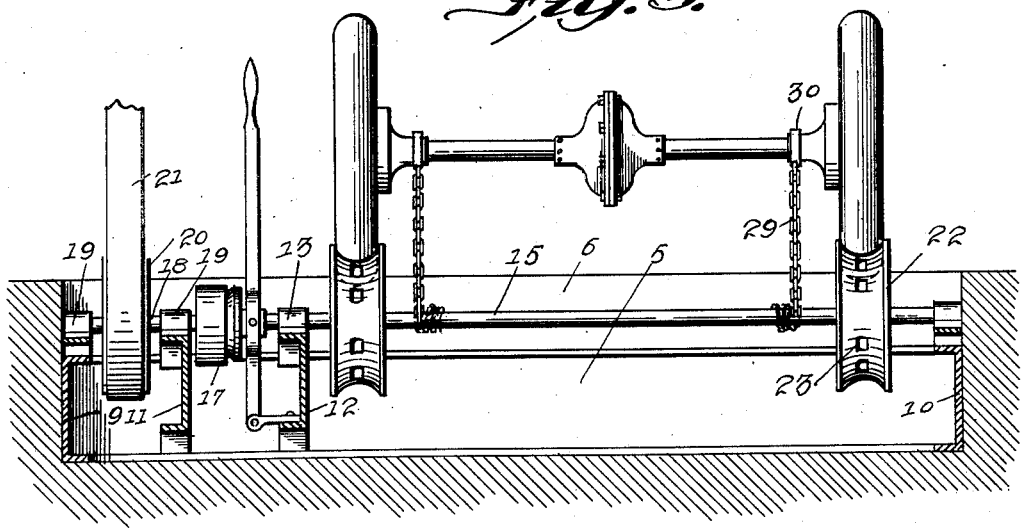
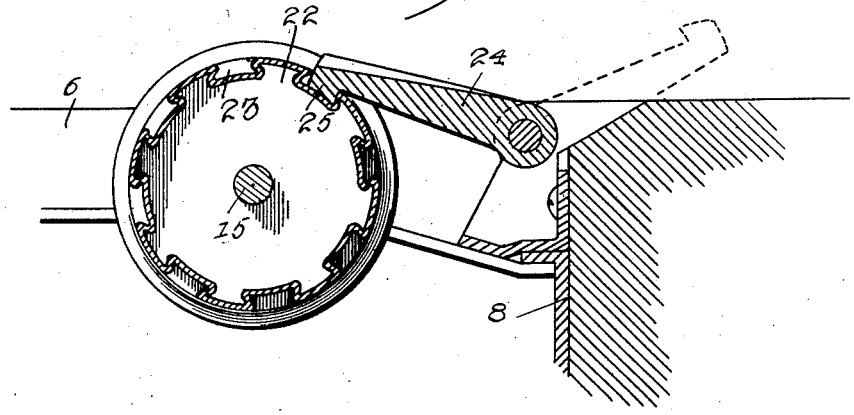

UNITED STATES PATENT OFFICE.

MITCHELL BROADUS WALKER AND GEORGE AIKEN MARTIN, OF LA GRANGE, NORTH CAROLINA.

GARAGE-SHOP MOTOR-CRANKING MACHINE.

1,366,614.     Specification of Letters Patent.     Patented Jan. 25, 1921.

Application filed March 16, 1920. Serial No. 366,451.

*To all whom it may concern:*

Be it known that we, MITCHELL BROADUS WALKER and GEORGE AIKEN MARTIN, citizens of the United States, and residents of La Grange, in the county of Lenoir and State of North Carolina, have invented certain new and useful Improvements in Garage-Shop Motor-Cranking Machines, of which the following is a specification.

Our invention relates to apparatus for starting the engines of automobiles.

An important object of this invention is to provide an apparatus through which power may be applied to the traction wheels of an automobile to start the engine, especially when the engine bearings are new, or whenever the engine, for any reason, does not start or run smoothly and easily.

A further object of this invention is to provide means whereby the automobile may be backed off of the starting mechanism under its own power after the engine has been started.

Further objects of the invention will appear in the following detailed description, taken in connection with the following drawings, forming a part of this specification, and in which:—

Fig. 3 is a rear elevation of the apparatus as installed in a pit, and

Fig. 4 is an enlarged sectional view of the rear driving wheel and the bridge piece of the apparatus.

Figure 1:
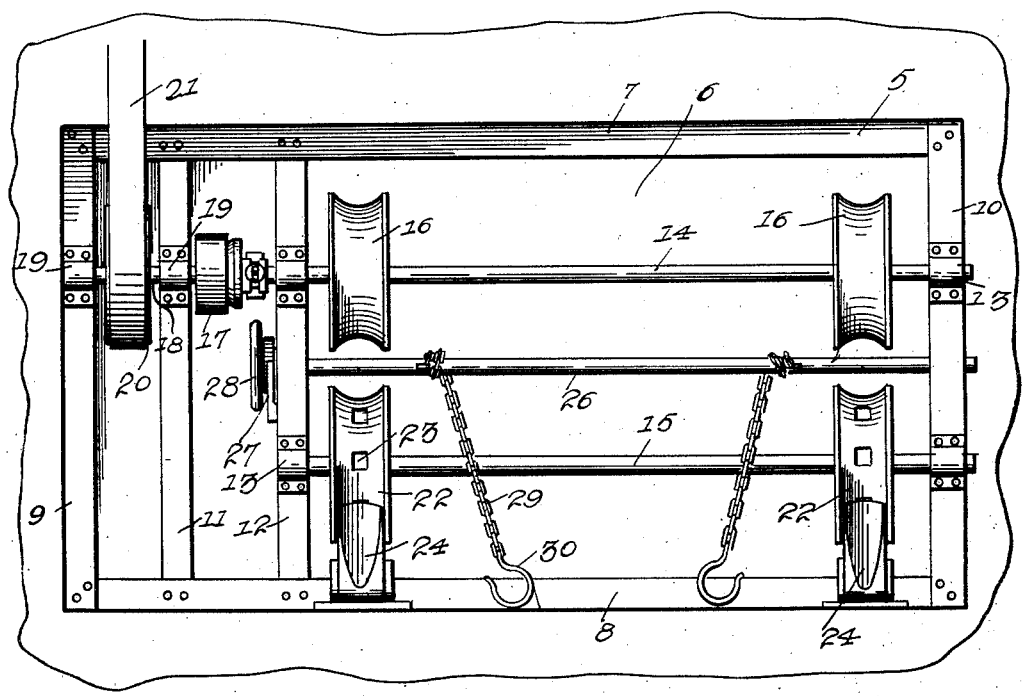
Figure 1 is a plan view of our apparatus.
Figure 2:
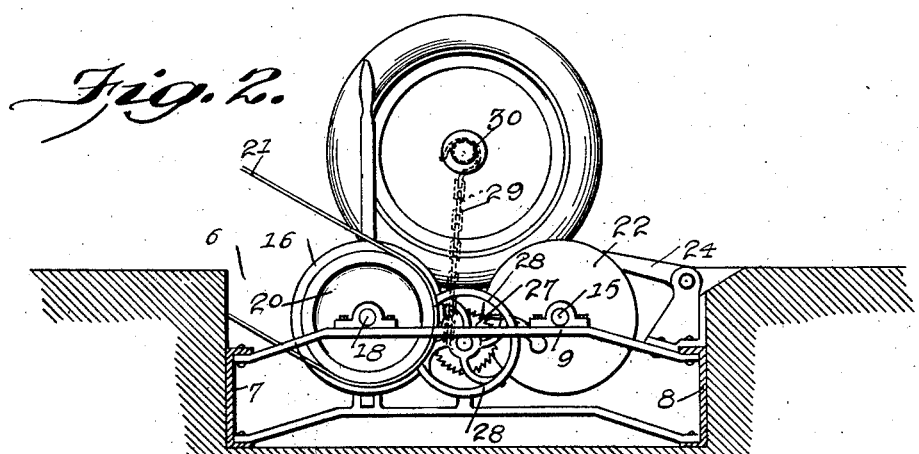
Fig. 2 is a side elevation showing the apparatus installed in a pit.

In the accompanying drawings, wherein similar numerals refer to similar parts throughout the same, the numeral 5 indicates the frame of the apparatus as mounted in a suitable pit 6 and consisting of side bars 7 and 8 and end bars 9 and 10 of channel iron or similar suitable material. Attached to the side bars 7 and 8 near the end bar 9 are spaced cross bars 11 and 12. Upon the end bar 10 and the cross bar 12 are mounted journal boxes 13 carrying the shafts 14 and 15. Upon the shaft 14 are mounted driving wheels 16 which are concaved in cross section suitable to receive automobile wheels.

Power may be applied to the shaft 14 through a clutch 17 from a shaft 18 journaled in boxes 19 on cross-bar 11 and end bar 9. Upon the shaft 18 is a pulley 20 driven through a belt 21 from any suitable source of power. The shaft 15 carries wheels 22 which are concaved in cross section suitable to receive the wheels of an automobile. About the peripheral surface of wheel 22 are a circumferential series of pockets 23.

Flush with the top edge of the pit are pivotally mounted suitable bridge pieces 24 having their upper surfaces channeled as shown and each having a detent 25 to engage the pockets 23 of the wheels 22. The bridge pieces thus serve the double purpose of a detent by which wheels 22 are held against rotation and a bridge whereby the automobile may be driven on to or off of the wheels 16 and 22.

In the bars 10 and 12 is journaled a shaft 26 carrying a pawl and ratchet 27 and a handle 28 at one end. To this shaft are also attached chains 29 having hooks 30 at their free ends which are adapted to engage the rear axle of the automobile.

The operation of this apparatus is as follows: The automobile is first run across the bridge 24 upon wheels 16 and 22 and the bridge pieces are lifted from engagement with the wheel 22 so that it will be enabled to rotate freely. The chains 29 are then attached to the rear axle by means of the hooks 30 and the shaft 26 is rotated by its handle 28 so that the chains will be tightened. The pawl and ratchet 27 will hold the shaft 26 against rotation and the automobile is thus securely held against movement. Power is then applied to pulley 20 from any suitable source of power through the belt 21 and when the clutch 17 is thrown into engagement, shaft 14 and wheels 16 will be rotated and will cause wheels 22 to rotate as idlers. When the clutch of the automobile is thrown into engagement the automobile engine will be acted upon and started running on its own power. If the engine or its bearings are new, or if for any reason it does not start and run easily and smoothly, it will thus be started by the apparatus and aided in its operation until it will continue to run freely and of its own accord.

When it is desired to remove the automobile from the apparatus the clutch of the automobile is thrown out of engagement and then the wheels 16 and 22 of the apparatus may be stopped. The pawl and ratchet 27 upon shaft 26 are thrown out of engagement so that the chain 29 will be loosened and may be unhooked from the rear axle of the automobile and the bridge pieces 24 are dropped down so that the detents 25 will engage pockets 23 on the wheels 22 and thus hold them against rotation. The clutch of the automobile is then thrown into engagement and the automobile may be backed off of the apparatus across the bridge pieces under its own power.

The invention will be found useful in connection with tightening bearings, limbering stiff motors, after grinding valves and overhauling, and to eliminate the necessity of towing the machine around over the streets to get it started.

It is to be understood that the form of our invention shown and described is to be taken as a preferred example of the same and changes in the size, shape and arrangement of parts may be resorted to without departing from the spirit of the invention or the scope of the subjoined claims.

Having thus described our invention, we claim:—

1. An apparatus for starting automobile engines by rotating the traction wheels thereof, comprising a frame, a shaft to drive the wheels of the vehicle extending across the frame, means to supply power to said shaft, rollers fixed to said shaft, an idler shaft extending across the frame, rollers upon the idler shaft alined with the first-named rollers and having a circumferential series of pockets about their periphery, bridge members to carry the vehicle onto the apparatus and having detents to engage the pockets in the idler rollers, holding them against rotation that the vehicle may be driven off under its own power, and means to hold the automobile rigidly upon the frame.

2. An apparatus for starting automobile engines by rotating the traction wheels thereof, comprising a frame, a driving shaft extending across the frame, means to supply power to said shaft, rollers fixed to said shaft, an idler shaft extending across the frame, rollers upon the idler shaft alined with the first-named rollers, and having a circumferential series of pockets about their periphery, and bridge members to carry the vehicle onto the apparatus and having detents to engage the pockets in the idler rollers, holding them against rotation.

3. An apparatus of the character described comprising, a frame, a driving shaft journaled in the frame, means for driving said shaft, rollers fixed to said shaft, an idler shaft journaled in the frame, rollers fixed to the idler shaft, and means adapted to support and guide the wheels of a vehicle onto the second mentioned rollers and to retain the latter against rotation.

4. In an apparatus substantially as described, the combination with a pair of spaced drums or rollers adapted to receive the wheels of an automobile, of bridge members alined with their respective drums or rollers to direct the wheels of an automobile thereto and having means for locking said drums from movement.

MITCHELL BROADUS WALKER.
GEORGE AIKEN MARTIN.